United States Patent [19]

Strader

[11] 4,381,874
[45] May 3, 1983

[54] WHEEL SPINDLE RETENTION FOR A NON-DRIVEN VEHICLE WHEEL

[75] Inventor: Don S. Strader, Lansing, Mich.

[73] Assignee: Motor Wheel Corporation, Lansing, Mich.

[21] Appl. No.: 205,874

[22] Filed: Nov. 10, 1980

[51] Int. Cl.³ .............................................. B60B 35/04
[52] U.S. Cl. .................................. 301/125; 301/126; 301/132; 308/236
[58] Field of Search ................ 308/DIG. 11, 207 R, 308/207 A, 211, 236, 1 A; 301/125, 126, 131-136, 111-113, 122, 121, 9 CN, 9 SC, 9 AH, 9 DH, 9 AC

[56] References Cited

U.S. PATENT DOCUMENTS

| | | |
|---|---|---|
| 325,762 | 9/1885 | Over . |
| 861,143 | 7/1907 | Scott . |
| 1,173,638 | 2/1916 | Baninger . |
| 1,247,991 | 11/1917 | Ney .................................. 301/9 SC |
| 1,299,691 | 4/1919 | Dery . |
| 2,119,520 | 6/1938 | Brokering . |
| 2,168,126 | 8/1939 | Kane . |
| 3,326,580 | 6/1967 | Munier et al. . |
| 4,046,433 | 9/1977 | Kiener ............................... 308/191 |

FOREIGN PATENT DOCUMENTS

| | | |
|---|---|---|
| 429758 | 6/1926 | Fed. Rep. of Germany . |
| 510524 | 10/1930 | Fed. Rep. of Germany . |
| 274543 | 1/1968 | U.S.S.R. . |

Primary Examiner—Charles A. Marmor
Attorney, Agent, or Firm—Barnes, Kisselle, Raisch, Choate, Whittemore & Hulbert

[57] ABSTRACT

In a wheel mounting arrangement which comprises a wheel-attachment spindle rotatably carried by roller bearings within a bearing hub and clamped thereto by a nut received on a threaded end of a spindle shaft, a locking device for preventing removal of the nut from the spindle shaft and consequent detachment of the spindle and spindle-attached wheel from the bearing hub and vehicle. The device comprises a locking snap ring received in a circumferential groove in the threaded spindle end so as to block removal of the nut. In accordance with a particular and critical feature of the invention, the groove and locking ring are axially spaced from the opposing surface of the nut in assembly and in normal operation so that the ring cooperates with the nut opposing surface to permit limited loosening of the nut. This feature permits limited axial movement of the spindle shaft with respect to the bearing and bearing hub causing an audible rattling sound which will warn the vehicle operator that the associated spindle nut should be retightened or otherwise serviced.

3 Claims, 6 Drawing Figures

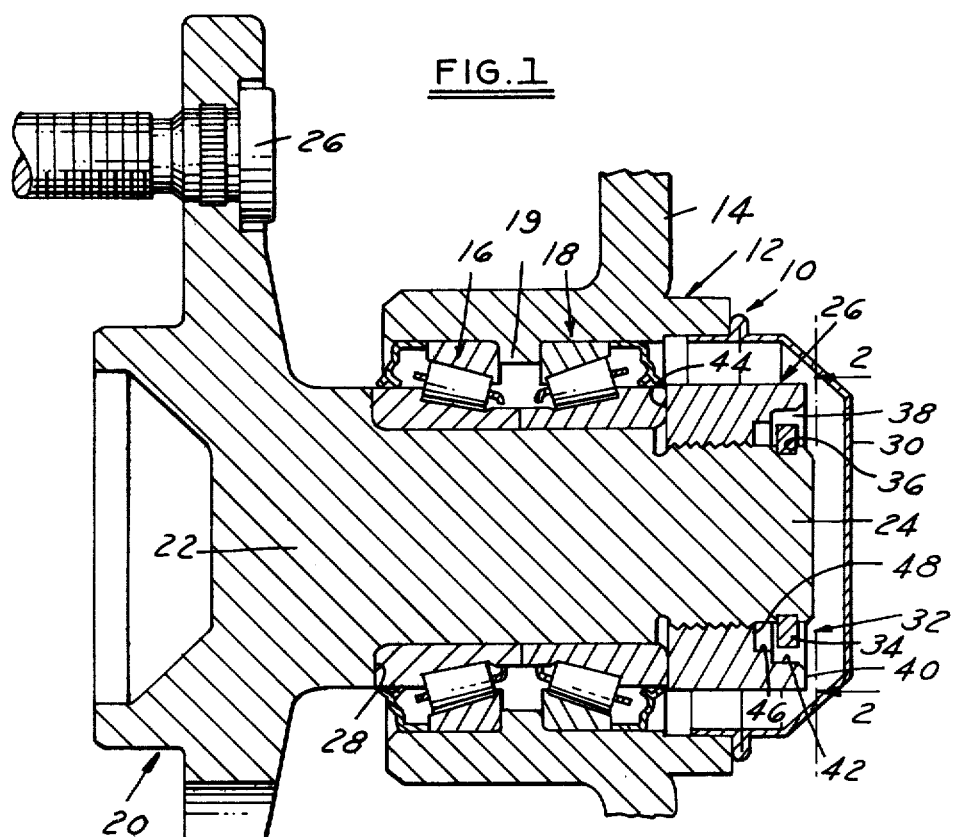
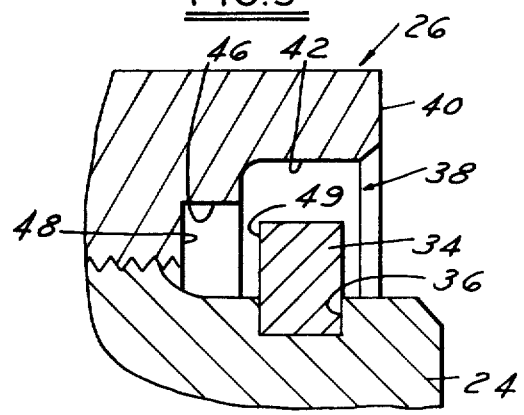
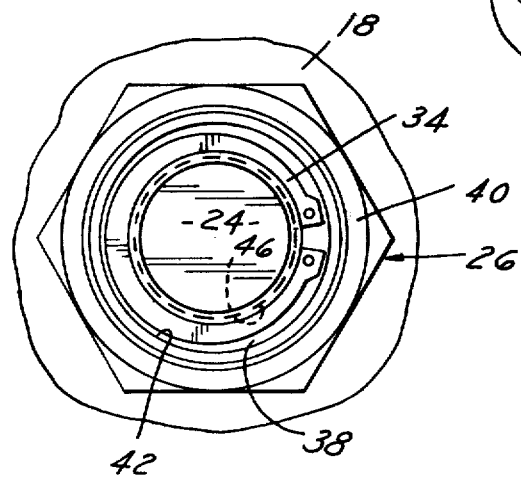
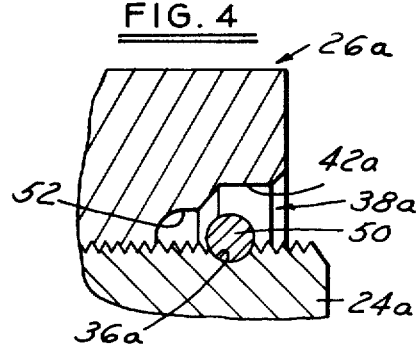

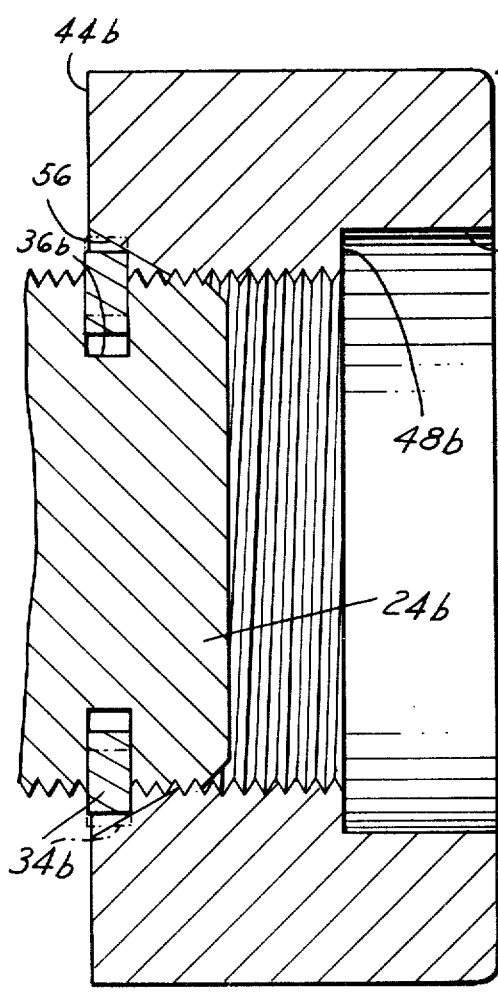
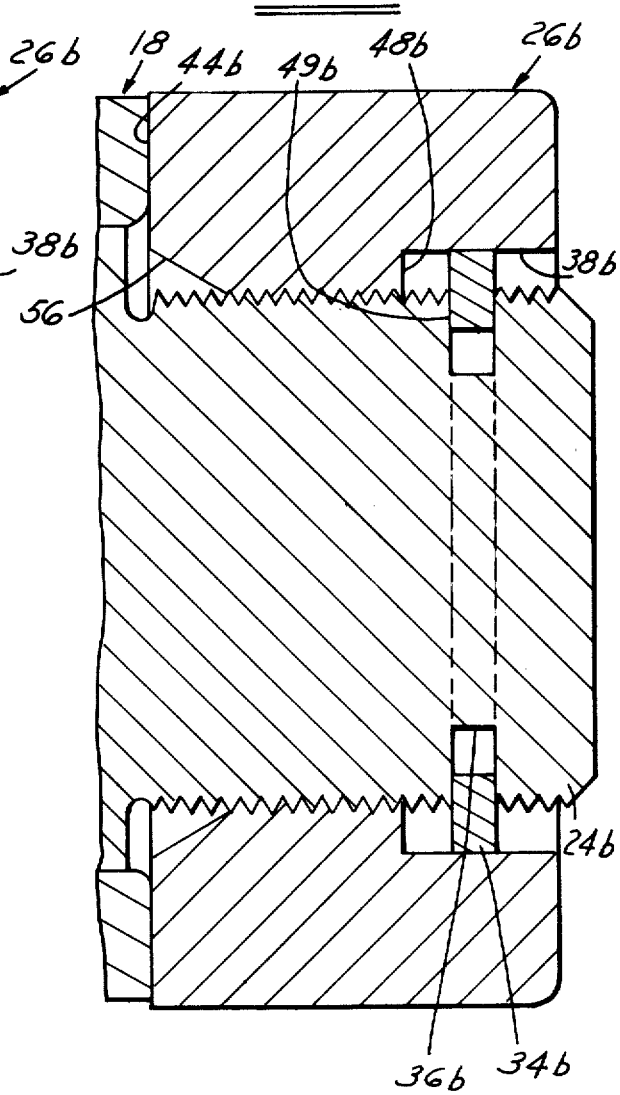

WHEEL SPINDLE RETENTION FOR A NON-DRIVEN VEHICLE WHEEL

The present invention is directed to wheel mounting devices, and more particularly to a device for retaining or locking the spindle of a non-driven vehicle wheel so as to prevent detachment of the wheel from the vehicle.

Mounting arrangements for non-driven vehicle wheels, such as the rear wheel of a front wheel drive automobile, conventionally comprise a wheel-attachment spindle rotatably carried by roller bearings within a bearing hub and clamped thereto by a nut received on the threaded inboard end of the spindle shaft. In mounting arrangements of this type, the nut may become loosened and removed from the spindle, particularly in the event of bearing failure, after which the wheel-attachment spindle and the wheel itself may become detached from the bearing hub and vehicle.

A general object of the present invention is to provide a mounting arrangement of the described type wherein removal of the mounting nut from the spindle, and consequent potential detachment of the spindle and wheel from the bearing hub and vehicle, is prevented. A further and more specific object of this invention is to provide a nut and spindle locking device which satisfies the foregoing objective, which is economical, which may be readily assembled in the factory, and/or which may be readily disassembled and reassembled in the aftermarket service environment. Yet another object of the invention is to provide a wheel and spindle locking device of the described type which operates in such a way that a vehicle operator will be warned that the spindle-mounting nut has become loosened and must be retightened or otherwise serviced.

To accomplish the foregoing and other objectives of the invention, a locking ring is received in a circumferential groove in the threaded spindle end so as to block removable of the nut. In accordance with a specific and critical feature of the invention, the groove and locking ring received therein are axially spaced from the opposing surface of the nut in assembly and during normal operation so that, in the event of loosening of the nut, the nut is permitted a limited number of turns before abutment with the locking ring. This feature permits limited axial movement of the spindle with respect to the bearings and bearing hub, causing rattling at the wheel which thereby warns a vehicle operator that the particular wheel nut must be retightened or otherwise serviced.

The invention, together with additional objects, features and advantages thereof, will be best understood from the appended claims, the following detailed description and the accompanying drawings in which:

FIG. 1 is a radial cross sectional view along the rotational axis of a wheel spindle and hub assembly which includes a spindle and nut locking device in accordance with a presently preferred embodiment of the invention;

FIG. 2 is a fragmentary end elevational view taken substantially along the line 2—2 in FIG. 1;

FIG. 3 is a fragmentary sectional view on an enlarged scale of a portion of FIG. 1 illustrating specific features of the invention in greater detail;

FIG. 4 is a fragmentary sectional view similar to that of FIG. 3 and illustrating a modified embodiment of the invention;

FIG. 5 is an enlarged fragmentary sectional view illustrating a second modified embodiment of the invention; and FIG. 6 is a sectional view showing the embodiment of FIG. 5 at an intermediate state of assembly.

FIGS. 1-3 illustrate a presently preferred embodiment of a wheel spindle and bearing hub carrier assembly 10 in accordance with the invention as comprising a bearing hub or bearing cap carrier 12 having a radiating integral external flange 14 for mounting hub 12 to a vehicle frame axle or the like (not shown). A pair of tapered roller bearings 16,18 are mounted internally of hub 12 and have outer races spaced from each other by the circular shoulder 19. A wheel-attachment cartridge bearing spindle and bolt sub-assembly 20 includes a stub shaft 22 rotatably internally carried by roller bearings 16,18 and an integral flange 24 radiating from an outboard end of shaft 22. (It will be appreciated that the terminology "inboard" and "outboard" are taken with reference to preferred orientation with respect to an associated vehicle.) A plurality of threaded studs 26 are mounted in a circumferential array on flange 24 in the usual manner for attachment thereto of a vehicle wheel and brake rotor, etc. (not shown). Shaft 22 terminates in a threaded inboard end 24 of reduced diameter which receives a nut 26 for clamping shaft 22 and thus spindle 20 to the inner races of bearings 16,18 in cooperation with the nut-opposing spindle shoulder 28. A dust cap 30 is received internally of bearing hub 14 over nut 26. Spindle and bearing hub assembly 10, to the extent thus far described, is generally conventional in construction.

In accordance with the present invention, locking means generally indicated at 32 are provided to retain nut 26 on threaded shaft end 24, and thereby to prevent detachment of spindle 20 and the associated spindle-mounted wheel (not shown) from the vehicle. In accordance with a preferred embodiment of the invention illustrated in FIGS. 1-3, locking means 32 comprises a split retaining ring 34 received by snap-fit in a circumferential groove 36 formed in the threaded end 24 of shaft 22. As best seen in FIG. 3, nut 26 is step counterbored at its inboard end to form an internal shoulder 38 in the inboard face 40 of nut 26 circumferentially surrounding the threaded opening of the nut and axially overlapping ring 34 in assembly. Shoulder 38 includes a first cylindrical counterbored shoulder portion 42 radially aligned in assembly with groove 36 and of a diameter sufficient to permit circumferential radial expansion of ring 34, using an appropriate tool (not shown), and assembly of ring 34 into groove 36 after nut 26 has been threaded onto shaft 22 such that outboard nut face 44 is snug against the inner race of roller bearing 18. Shoulder 38 also includes a second cylindrical counterbored shoulder portion 46 of lesser diameter than, and extending coaxially inwardly from, shoulder portion 42. Shoulder portion 46 has a predetermined diameter slightly greater than the diameter of ring 34 as received and held in groove 36 such that shoulder 46 has assembly clearance with snap ring 34 but not enough clearance to allow ring 34 to be expanded out of groove 36.

In operation in the event of loosening of nut 26, the nut is permitted threadably to rotate and thus have limited axial movement in the loosening direction away from inboard bearing 18 until the axially directed face 48 of shoulder portion 46 abuts the opposing surface 49 of ring 34. At such position of abutment, further loosening of nut 26 is prevented by ring 34, and nut shoulder portion 46 of lesser diameter axially overlaps and restrains expansion of ring 34 from the radial direction and thereby prevents removal of the locking ring from groove 36. Such limited displacement of nut 26 with respect to shaft 22 and bearings 16,18 permits axial limited movement of the spindle with respect to the bearings and bearing hub, thereby producing an audible rattling sound which warns an operator of the vehicle that the associated spindle retaining nut requires retightening. In the event that one or both of the bearings 16,18 require replacement in the aftermarket, spindle 20 may be removed therefrom by first tightening nut 26 and then removing retaining ring 34 using an appropriate tool. Nut 26 may then be removed from shaft end 24 and the spindle shaft removed from within bearings 16,18.

FIG. 4 illustrates a modified embodiment of the invention wherein the split retaining snap ring 50 and the ring-abutting inner shoulder portion 53 are circular in radial cross-section. The embodiment of FIG. 4 is otherwise identical in function and operation to that of FIGS. 1-3, with corresponding elements thereof being indicated by identical reference numerals followed by the suffix "a".

FIGS. 5 and 6 illustrate a second modified embodiment of the invention wherein the split retaining snap ring is assembled on the spindle shaft prior to threading thereon of the spindle retaining nut. Referring to FIG. 5, the ring-receiving circumferential groove 36b in threaded shaft end 24b has a diameter which is substantially less than the relaxed or free-state diameter of retaining ring 34b such that the retaining ring normally floats within the spindle groove 54 and may be circumferentially compressed therewithin to a diameter less than the root diameter of the spindle external threads. The internal shoulder 38b on nut 26b is of constant diameter slightly greater than the relaxed diameter of ring 34b, but less than the outside diameter of ring 34b when radially expanded to be clear of groove 36b. The outboard bearing-abutment face 44b of nut 26b includes a conical internal camming shoulder 56.

In assembly, ring 34b is first expanded and slipped onto spindle shaft end 24b until registered with and snapped into mounted position in groove 36b. Nut 26b is then threaded onto shaft end 24b. Upon engagement of nut 26b with retaining ring 34b as shown in FIG. 6, the retaining ring is circumferentially and radially compressed into groove 36b by the camming action of conical shoulder 56 so as to permit passage thereover of nut 26b as the same is further threaded onto shaft end 24b. As nut 26b is threaded into clamping engagement with the inner race of bearing 18 (FIG. 5), the internal threads of nut 26b move axially clear of ring 34b and shoulder 38b is brought into axially overlapping, radial registry with retaining ring 34 such that the retaining ring is permitted to expand to its relaxed condition. The axial spacing between the axially directed nut face 48b and the opposing surface 49b of ring 34b operates to permit limited loosening of nut 26b in the manner previously described.

The invention claimed is:

1. A wheel mounting arrangement for a vehicle wheel comprising bearing hub means for attachment to vehicle wheel suspension means, bearing means carried by said bearing hub means, spindle means adapted for mounting of a vehicle wheel thereto and including a shaft rotatably carried by said bearing means having a threaded end portion projecting from within said bearing means, a nut threaded onto said shaft end portion and having an axial outboard face for engaging said bearing means to clamp said shaft with respect to said bearing means, and a split lock ring adapted for circumferential expansion for assembly onto said shaft with said nut engaging said bearing means and at a predetermined position normally axially spaced from said nut at a nominal axial distance from abutment with said nut, said nut having an axial inboard face with an internal shoulder having a depth in a direction parallel to the axis of said shaft greater than said nominal axial distance, said internal shoulder including a first portion adjacent said inboard face having a diameter sufficient to permit assembly of said split ring onto said shaft and a second portion of lesser diameter coaxially outboard of said first portion, said lock ring permitting limited loosening of said nut with respect to said bearing means and said bearing hub means, said second portion of said internal shoulder overlapping and capturing said lock ring upon said limited loosening of said nut and preventing removal of said nut from said shaft, such that operation of the vehicle following said limited loosening of said nut results in rattling at the associated bearing means and wheel.

2. The wheel mounting arrangement set forth in claim 1 wherein said threaded end of said shaft includes a circumferential groove, and wherein said lock ring is received in said groove.

3. A wheel mounting arrangement for a vehicle wheel comprising bearing hub means for attachment to vehicle wheel suspension means, bearing means carried by said bearing hub means, spindle means adapted for mounting of a vehicle wheel thereto and including a shaft rotatably carried by said bearing means having a threaded end portion projecting from within said bearing means, a nut threaded onto said shaft end portion and having an axial outboard face for engaging said bearing means to clamp said shaft with respect to said bearing means, and a split lock ring adapted for assembly onto said shaft end portion at a predetermined position normally axially spaced from said nut at a nominal axial distance from abutment with said nut, said nut having an axial inboard face with a first internal shoulder with a depth in a direction parallel to the axis of said shaft greater than said nominal axial distance, said shaft including a circumferential groove having a groove root with a diameter less than the relaxed diameter of said lock ring, said lock ring being loosely mounted in said groove, said outboard face of said nut including a conical second internal shoulder surrounding the threaded opening in said outboard face such that said lock ring may be mounted in assembly to said shaft within said groove and said nut then threaded onto said shaft with said conical second shoulder operating to compress said lock ring circumferentially into said groove so as to permit threaded passage thereover of said nut, said lock ring permitting limited loosening of said nut with respect to said bearing means and said bearing hub means, said first internal shoulder overlapping and capturing said lock ring within said groove upon said limited loosening of said nut and preventing removal of said nut from said shaft, such that operation of the vehicle following said limited loosening of said nut results in rattling at the associated bearing means and wheel.

* * * * *